United States Patent
Gunasekara et al.

(10) Patent No.: US 7,929,970 B1
(45) Date of Patent: Apr. 19, 2011

(54) METHODS AND SYSTEMS FOR TEMPORARILY MODIFYING A MACRO-NETWORK NEIGHBOR LIST TO ENABLE A MOBILE STATION TO HAND OFF FROM A MACRO NETWORK TO A FEMTO CELL

(75) Inventors: Don Gunasekara, Reston, VA (US); Sunil Prasad, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 778 days.

(21) Appl. No.: 11/963,303

(22) Filed: Dec. 21, 2007

(51) Int. Cl.
*H04W 36/00* (2009.01)
(52) U.S. Cl. .......................... 455/444; 455/437
(58) Field of Classification Search .......... 455/437–444, 455/522–525; 370/254, 338–348
See application file for complete search history.

(56) References Cited

U.S. PATENT DOCUMENTS

| | | | |
|---|---|---|---|
| 6,542,744 B1 * | 4/2003 | Lin | 455/437 |
| 2002/0168982 A1 * | 11/2002 | Sorokine et al. | 455/442 |
| 2007/0097938 A1 * | 5/2007 | Nylander et al. | 370/338 |
| 2008/0153533 A1 * | 6/2008 | Claussen et al. | 455/522 |
| 2010/0260068 A1 * | 10/2010 | Bhatt et al. | 370/254 |

* cited by examiner

*Primary Examiner* — Kent Chang
*Assistant Examiner* — Kashif Siddiqui (57) ABSTRACT

Methods and systems are disclosed for temporarily modifying a macro-network neighbor list to enable a mobile station to hand off from a macro network to a femto cell. A method includes receiving a signal indicating that the mobile station detected coverage of a femto cell; after receiving the signal, adding the femto cell to the neighbor list, thereby enabling the mobile station to handoff to the femto cell; detecting that the mobile station completed handoff to the femto cell; and in response to detecting that the mobile station completed handoff to the femto cell, removing the femto cell from the neighbor list.

20 Claims, 6 Drawing Sheets

Neighbor List

Sector 103A
Sector 103D

Subsequently-Modified Neighbor List

Sector 103A
Sector 103D
Femto Cell 116

FIGURE 5

METHODS AND SYSTEMS FOR TEMPORARILY MODIFYING A MACRO-NETWORK NEIGHBOR LIST TO ENABLE A MOBILE STATION TO HAND OFF FROM A MACRO NETWORK TO A FEMTO CELL

BACKGROUND

Cellular wireless is an increasingly popular means of personal communication in the modern world. A cellular wireless network may include a plurality of base transceiver stations (BTSs), each BTS providing a respective coverage area. Generally, when a mobile station is positioned within a coverage area of a BTS, the mobile station can communicate over an air interface with the BTS, and in turn over one or more circuit-switched and/or packet-switched signaling and/or transport networks to which the BTS provides access.

The coverage area of a BTS is sometimes referred to as a cell. A given cell may be divided geographically into a number of sectors (which can be visualized ideally as pie pieces), with each sector being defined respectively by radiation patterns from directional antenna components of the respective BTS, or by respective BTS antennae. In operation, a BTS typically emits a pilot signal on each sector, and a mobile station in receipt of a pilot signal constantly measures the strength ($E_c/I_o$, i.e., energy versus spectral density) of the pilot and notifies the cellular wireless network when the signal strength of the pilot falls above or below designated thresholds.

The cellular wireless network providing service to the mobile station usually stores a "neighbor list" (or "macro-network neighbor list") of the one or more sectors currently serving the mobile station. In particular, the neighbor list typically includes sectors in the cellular wireless network that are not in the mobile station's active set (i.e., the one or more sectors currently serving the mobile station), but are nonetheless in close proximity to the one or more sectors serving the mobile station.

Further, a mobile station may maintain in its memory, in addition to the neighbor list, a list of the sectors in its active set and a list of "candidate" sectors, the candidate sectors including sectors that are not yet in the active set but that have sufficient signal strength such that the mobile station could demodulate signals from those sectors. All other possible sectors are members of a "remaining" set. During operation, if a pilot signal from a given sector in the neighbor list is above a threshold pilot-signal strength, then the mobile station may notify the cellular wireless network to this fact, and the cellular wireless network may responsively enable the mobile station to hand off to the given sector.

BTSs of the above-described cellular wireless network are typically not associated with any subscriber or small group of subscribers in particular; rather, they are placed in publicly-accessible locations and are used by the service provider's customers generally. These BTSs collectively blanket cities, rural areas, etc. with coverage; as such, they are referred to generally and herein as "macro BTSs" or "macro-network BTSs." The coverage area associated with a given macro BTS may be referred to as a "macro coverage area," and the macro coverage area may be associated with a "macro cell" and/or divided into "macro sectors." Further, the cellular wireless network to which a macro BTS belongs may be referred to as a "macro network."

To address gaps in macro-network coverage (e.g., in buildings) and for other reasons, macro-network service providers have recently begun offering consumers devices referred to herein as femto cells, which may also be referred to as femto base stations, femto BTSs, picocells, pico base stations, pico BTSs, microcells, micro base stations, micro BTSs, private base stations, private BTSs, low cost Internet base stations (LCIBs), and by other names. Note that the aforementioned terms that end in "cell" may also be generally and herein used interchangeably to refer to the coverage area provided by the respective device. Hence, the term "femto cell" may be used interchangeably with the term "femto coverage area."

A typical femto cell may be approximately the size of a desktop phone or WiFi access point, and may be characterized as a low-power, low-capacity version of a macro base station. Femto cells are typically located in a person's home or office, as examples.

The femto cell may have a wired (e.g. Ethernet) or wireless (e.g. WiFi) connection with the user's router, and would thus have connectivity to the Internet and/or one or more other packet-data networks via the user's broadband connection. A femto cell may establish a virtual-private-network (VPN) connection over the Internet with an entity (e.g. a VPN terminator) on the wireless-service (macro-network) provider's core network, and thereby be able to securely communicate with the VPN terminator and other entities on that core network and beyond.

The femto cell may also have a wireless-communication (e.g. CDMA) interface that is compatible with a user's mobile station(s), such that the femto cell may act as a micro base station, providing coverage on the wireless-service provider's network via the user's Internet connection. Usually, a femto cell will provide service on a single RF carrier (or on a single carrier per technology, where multiple technologies (e.g., CDMA, EV-DO) are supported), and also transmit a pilot signal that identifies the femto cell.

OVERVIEW

A macro network may include one or more macro coverage areas that cooperatively serve a mobile station, and the macro network may store a neighbor list corresponding to the one or more macro coverage areas cooperatively serving the mobile station. During operation, the mobile station may detect coverage of a femto cell, and it may be desirable for the mobile station to hand off to the femto cell. To facilitate handoff to the femto cell, the macro network may add the femto cell to the neighbor list, and send to the mobile station a Neighbor List Update Message (NLUM) that includes the femto cell. Upon receipt of the NLUM, the mobile station may then hand off to the femto cell, perhaps using conventional handoff procedures.

However, problems may arise if the macro network continues to store the femto cell in the neighbor list after handoff has been completed. For instance, with the increasing popularity of femto cells, the neighbor list may become saturated by listing too many femto cells. Further, a given mobile station that is served by the macro coverage area may receive an NLUM that includes a femto cell, but the mobile station may not be authorized to be served by the femto cell. In this case, the mobile station wastes resources and time scanning the unauthorized femto cell in the normal course of mobile-station operation.

As such, methods and systems are provided for temporarily modifying the neighbor list to enable the mobile station to hand off from the macro network to the femto cell. In one aspect, an embodiment of the present invention may take the form of a method. The method includes receiving a signal indicating that the mobile station detected coverage of a femto cell; after receiving the signal, adding the femto cell to the neighbor list, thereby enabling the mobile station to handoff to the femto cell; detecting that the mobile station completed handoff to the femto cell; and, in response to detecting that the mobile station completed handoff to the femto cell, removing the femto cell from the neighbor list.

In another aspect, an embodiment of the present invention may take the form of another method. The method includes receiving a signal from the mobile station. The signal preferably identifies the femto cell, which is initially not included in the neighbor list. The method further includes, in response to receiving the signal, temporarily modifying the neighbor list to include the femto cell; providing to the mobile station an indication of the modified neighbor list, thereby enabling the mobile station to hand off from the macro network to the femto cell; receiving a message indicating that the mobile station completed handoff to the femto cell; and in response to receiving the message indicating that the mobile station completed handoff to the femto cell, removing the femto cell from the modified neighbor list.

In some instances, the step of receiving the signal from the mobile station occurs after the mobile station receives a pilot signal from the femto cell. The pilot signal preferably identifies the femto cell and defines a pilot-signal strength that is above a predetermined threshold. In an example, the signal from the mobile station is a Pilot Strength Measurement Message (PSMM) that identifies the femto cell and includes an indication of the pilot-signal strength.

In some examples, the method further includes, in response to receiving the signal, determining whether the mobile station is authorized to be served by the femto cell. Determining whether the mobile station is authorized to be served by the femto cell may include referring to profile data corresponding to the mobile station, and determining whether the profile data indicates that the mobile station is authorized to be served by the femto cell. In some instances, the macro network includes the profile data.

In one case, providing to the mobile station an indication of the modified neighbor list includes sending to the mobile station an NLUM that includes the femto cell. In another case, receiving the message indicating that the mobile station completed handoff to the femto cell includes receiving a Handoff Completion Message (HCM) from the mobile station.

In some examples, the method further includes modifying a handoff process for the mobile station such that the handoff process is biased toward handoff of the mobile station to the femto cell. In one example, the macro network stores a value indicating a threshold pilot-signal strength that must be exceeded to justify handoff to a given coverage area, and modifying the handoff process for the mobile station includes enabling the mobile station to handoff to the femto cell when a pilot-signal strength from the femto cell is lower than the threshold pilot-signal strength.

In an example, the macro network is a radio access network. In another example, the femto cell includes a plurality of femto coverage areas.

In yet another aspect, an embodiment of the present invention may take the form of a system. The system includes a communication interface, a processor, and data storage. Data storage contains (i) the macro-network neighbor list and (ii) instructions executable by the processor to, via the communication interface, receive a signal from the mobile station. The signal preferably identifies the femto cell, and the femto cell is initially not included in the macro-network neighbor list. Data storage further includes instructions to: in response to receiving the signal, temporarily modify the macro-network neighbor list to include the femto cell; via the communication interface, provide to the mobile station an indication of the modified macro-network neighbor list, thereby enabling the mobile station to hand off from the macro network to the femto cell; via the communication interface, receive a message indicating that the mobile station completed handoff to the femto cell; and in response to receiving the message indicating that the mobile station completed handoff to the femto cell, remove the femto cell from the modified macro-network neighbor list.

In one case, the step of receiving the signal from the mobile station occurs after the mobile station receives a pilot signal from the femto cell. The pilot signal preferably identifies the femto cell and defines a pilot-signal strength that is above a predetermined threshold. In another case, data storage further includes instructions to, in response to receiving the signal, determine whether the mobile station is authorized to be served by the femto cell. In yet another case, the instructions to provide to the mobile station the indication of the modified macro-network neighbor list include instructions to send to the mobile station an NLUM that includes the femto cell. In some instances, the message is an HCM.

In other examples, data storage further includes instructions to modify a handoff process for the mobile station such that the handoff process is biased toward handoff of the mobile station to the femto cell. In yet other examples, the femto cell includes a plurality of femto coverage areas.

These as well as other aspects and advantages will become apparent to those of ordinary skill in the art by reading the following detailed description, with appropriate reference to the accompanying drawings.

BRIEF DESCRIPTION OF THE DRAWINGS

Various exemplary embodiments are described herein with reference to the following drawings, wherein like numerals denote like entities.

DETAILED DESCRIPTION

A. System Architecture

Figure 1:
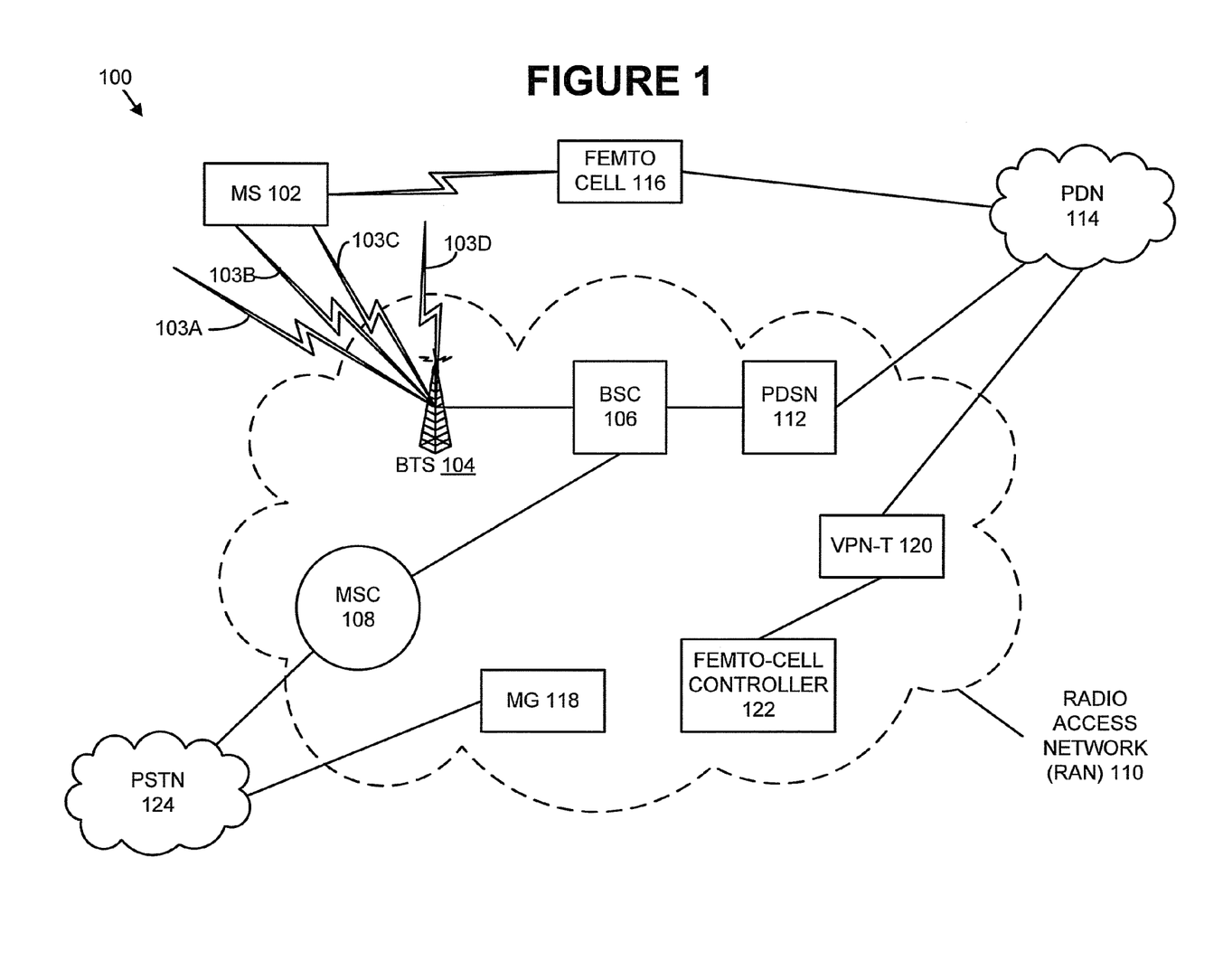
FIG. 1 is a block diagram of a communications system, in accordance with exemplary embodiments.

FIG. 1 is a block diagram of a communications system 100 for use in carrying out an embodiment of the present invention. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location.

Various functions described herein as being performed by one or more entities may be carried out by hardware, firmware, and/or software. And various functions may be carried out by a processor executing instructions stored in memory.

As shown in FIG. 1, the communications system 100 includes a mobile station 102, a RAN 110, a femto cell 116, a packet-data network (PDN) 114, and a public switched telephone network (PSTN) 124.

The RAN 110 and mobile station 102 may operate according to any wireless communication protocol now known or later developed, examples of which include without limitation CDMA (e.g., CDMA2000, EV-DO, IS-95, IS-2000, 1xRTT, 1xEV-DO), iDEN, TDMA, AMPS, GSM, GPRS, UMTS, EDGE, WiMAX (e.g., IEEE 802.16), LTE, microwave, millimeter wave, satellite, MMDS, Wi-Fi (e.g., IEEE 802.11), Bluetooth, and infrared.

Generally speaking, the mobile station 102 can be any wireless communication device that is capable of wirelessly communicating with the RAN 110. The term "mobile station" designates any such wireless communication device, regardless of whether the device is currently or permanently situated in a fixed position (e.g., attached to a wall or desk), and regardless of whether the device is easily movable (e.g., handheld or pocket-sized) or battery-operated. As examples, the mobile station could be or include a mobile phone, a PDA, a computer, a laptop computer, a hybrid CDMA/EV-DO device, and/or a multi-mode cellular/Wi-Fi device.

The RAN 110 (or macro network), in turn, may be any wireless serving network that is capable of communicating over an air interface with one or more mobile stations. As such, the RAN 110 will include one or more antennas, one or more transceivers, and associated control logic for engaging in air-interface communication with mobile stations according to any agreed air-interface protocol.

The RAN 110 may provide connectivity with one or more transport networks and may include logic to set up and carry communications between served mobile stations and entities on the transport network(s). In particular, the RAN 110 may include a network interface and may include program logic arranged to detect a communication (e.g., a signaling message or bearer traffic) arriving via the network interface and ultimately establish a communication path over the air to the mobile station.

Likewise, the RAN 110 may enable served mobile stations to communicate with each other. For instance, the RAN 110 may include a switch, bridge, or router function and associated logic arranged to detect a communication arriving over the air from one served mobile station and destined to another mobile station, and ultimately establish a communication path between the mobile stations via the RAN 110.

RAN 110 may define a plurality of sectors (i.e., any wireless coverage areas established by reference to BTS emissions or the like) in which mobile stations can communicate with the RAN 110. In particular, FIG. 1 shows the RAN 110 radiating to define at least four sectors, labeled respectively 103A, 103B, 103C, and 103D, although the RAN 110 can define any number of sectors. The RAN 110 may define these sectors discretely through use of directional antennas and/or by various modulation parameters, including, without limitation, carrier frequencies and pseudo-random number offsets (PN offsets) or other parameters, depending on the air interface protocol used. In practice, the sectors may overlap to some extent, so that a served mobile station can communicate with multiple sectors when at a particular location.

Without limitation, FIG. 1 depicts an example configuration of the RAN 110. As shown, the RAN 110 includes a macro BTS 104, a base station controller (BSC) 106, a mobile switching center (MSC) 108, a packet data serving node (PDSN) 112, a media gateway (MG) 118, a VPN terminator (VPN-T) 120, and a femto-cell controller 122. Of course, additional entities could be present, such as additional mobile stations in communication with the macro BTS 104, additional BTSs in communication with the BSC 106, additional BSCs in communication with the MSC 108 and/or PDSN 112, additional MGs in communication with the PTSN 124, additional VPN-Ts in communication with the PDN 114, and additional femto-cell controllers in communication with the VPN-T 120. And some entities may be omitted altogether.

As shown in FIG. 1, the RAN 110 is communicatively coupled to each of the PSTN 124 and PDN 114. In particular, the MSC 108 is communicatively coupled to the PSTN 124, and the PDSN 112 and VPN-T 120 are each communicatively coupled to the PDN 114. Of course, there could be additional entities in communication with the PSTN 124 and/or PDN 114. And there could be one or more devices and/or networks making up at least part of one or more of the communication links between the MSC 108 and PSTN 124, MG 118 and PSTN 124, PDSN 112 and PDN 114, and/or VPN-T 120 and PDN 114. For example, there could be one or more routers, switches, other devices, or other networks on the link between the MSC 108 and PSTN 124 and/or PDSN 112 and PDN 114. Further, the PSTN 124 and PDN 114 may be connected via one or more gateways and/or other devices. Of course, other variations, additions, and/or omissions are possible as well.

The mobile station 102 may be any mobile device arranged to carry out the mobile-station functions described herein. As such, the mobile station 102 may include a user interface, a wireless-communication interface, a processor, and data storage containing instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro BTSs and/or one or more femto cells over suitable air interfaces. For example, the chipset could be suitable for CDMA communication. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

The macro BTS 104 may be any network element arranged to carry out the BTS functions described herein. As such, the macro BTS 104 may include a communication interface, a processor, and data storage containing instructions executable by the processor to carry out those BTS functions. Each of the communication interfaces may include one or more antennas, chipsets, and/or other components for providing one or more coverage areas such as cells and sectors, for communicating with mobile stations over an air interface. The macro BTS 104 preferably includes directional antennas, power amplifiers, and associated transceiver equipment arranged to establish the sectors shown and to communicate with served mobile stations. As examples, some or all of sectors 103A, 103B, 103C, and 103D may emanate from a single macro BTS (i.e., a single cell site), or various ones of the sectors may emanate from separate macro BTSs. Each of the communication interfaces may also include one or more wired (e.g., a wired Ethernet interface) and/or wireless interfaces for communicating with the BSC 106.

The BSC 106 may be any network element arranged to carry out the BSC functions described herein. In general, the BSC 106 may function to control one or more macro BTSs such as the macro BTS 104, and to provide those one or more macro BTSs with connections to devices such as the MSC 108 and PDSN 112. More particularly, among other functions, the BSC 106 may manage aspects of air interface operation. For instance, the BSC 106 may manage assignment of air-interface traffic channels to the mobile station 102 in response to mobile station 102 origination messages.

Further, the BSC 106 may manage handoff procedures of the mobile station 102 between sectors and/or cells such as the femto cell 116 and the sectors 103A, 103B, 103C, and 103D, by engaging in control channel signaling, for instance. As an example, the BSC 106 may transmit to the mobile station 102 an indication of a neighbor list for the one or more sectors in the mobile station's 102 initially selected active set. Further, the BSC 106 may receive PSMMs from the mobile station 102, the PSMMs operating to report on pilot signals detected by the mobile station 102. And the BSC 106 may send Handoff Direction Messages (HDMs) to the mobile station 102, directing the mobile station 102 to add or remove particular sectors from the mobile station's 102 active set, i.e., to hand off from one sector to another. The BSC 106 is also described in connection with FIG. 2.

Note that the combination of the macro BTS 104 and BSC 106 may be considered a macro base station. However, the macro BTS 104 or BSC 106 could, taken alone, be considered a macro base station as well. Furthermore, a macro base station may be considered to be either or both of those devices, and perhaps make use of one or more functions provided by the MSC 108, PDSN 112, and/or any other entity, without departing from the scope and spirit of the present invention.

The MSC 108 may be any networking element arranged to carry out the MSC functions described herein. Thus, the MSC 108 may include a communication interface, a processor, and data storage containing instructions executable by the processor to carry out those MSC functions. The communication interface may include one or more wired and/or wireless interfaces for communicating with at least the BSC 106 and PSTN 124. In general, the MSC 108 acts as a switch between the PSTN 124 and one or more BSCs such as the BSC 106, facilitating communication between mobile stations and the PSTN 124.

The PDSN 112 may be any networking element arranged to carry out the PDSN functions described herein. As such, the PDSN 112 may include a communication interface, a processor, and data storage containing instructions executable by the processor for carrying out those PDSN functions. The communication interface may include one or more wired and/or wireless interfaces for communicating with at least the BSC 106 and PDN 114. In general, the PDSN 112 acts as a network access server between the PDN 114 and BSCs such as the BSC 106, facilitating packet-data communication between mobile stations and the PDN 114, via macro base stations.

The PDN 114 may be the well-known global packet-data network generally referred to as the Internet. However, the PDN 114 may also be or include one or more other packet-data networks, without departing from the scope and spirit of the present invention. As such, the PDN 114 may include one or more wide-area networks, one or more local-area networks, one or more public networks, one or more private networks, one or more wired networks, one or more wireless networks, and/or one or more networks of any other type. Devices in communication with the PDN 114 may exchange data using a packet-switched protocol such as the Internet Protocol (IP), and may be identified by an address such as an IP address.

The femto cell 116 may be any computing and communication device arranged to carry out the femto-cell functions described herein. As such, the femto cell 116 may include a communication interface, a processor, and data storage containing instructions executable by the processor for carrying out those femto-cell functions. The communication interface of the femto cell 116 may include an Ethernet or WiFi interface for communicating with a device such as a router and/or a cable modem. The femto cell 116 may have a wired (e.g. Ethernet) or wireless (e.g. WiFi) connection with a user's router, and would thus have connectivity to the PDN 114 and/or one or more other packet-data networks via a user's broadband connection. The femto cell 116 may establish a VPN connection over the PDN 114 with an entity (e.g. the VPN-T 120) on the RAN 110, and thereby be able to securely communicate with the VPN-T 120 and other entities on the RAN 110 and beyond.

The communication interface may also include a wireless interface for communicating with one or more mobile stations according to a protocol such as CDMA (and/or one or more other technologies), such that the femto cell 116 may act as a micro base station, providing coverage on the RAN 110 via a user's Internet connection. The femto cell 116 usually provides service on a single RF carrier, but may provide service on multiple RF carriers. If the femto cell 116 provides service on multiple RF carriers, then the femto cell 116 may include a plurality of femto coverage areas.

In general, the femto cell 116 may be designed to have low transmission-power capabilities, and consequently to provide coverage areas that are relatively limited in comparison with those of typical macro BTSs. As examples, the femto cell 116 may be designed to provide a coverage area that is the size of a dorm room, an apartment, a house, and so on. Further, the femto cell 116 may transmit what is known as a pilot signal (or pilot beacon) that identifies the femto cell 116 and defines a pilot-signal strength.

The MG 118 may be any networking element arranged to carry out the media-gateway functions described herein. As such, the MG 118 may include a communication interface, a processor, and data storage containing instructions executable by the processor for carrying out those media-gateway functions. The communication interface may include a circuit-switched interface and a packet-switched interface. The MG 118 may (a) receive packet-based communications from the RAN 110, convert those to circuit-switched communications, and pass them to the PSTN 124 and (b) receive circuit-switched communications from the PSTN 124, convert those to packet-based communications, and pass them to RAN 110.

The VPN-T 120 may be any networking element arranged to carry out the VPN-terminator functions described herein. Thus, the VPN-T 120 may include a communication interface, a processor, and data storage containing instructions executable by the processor for carrying out those VPN-terminator functions. The communication interface may include one or more wired and/or wireless interfaces for communicating with at least the femto-cell controller 122 and PDN 114. In general, the VPN-T 120 functions to establish secure VPN connections over the PDN 114 with femto cells such as the femto cell 116, enabling the femto cells to securely communicate with devices on the RAN 110 such as the femto-cell controller 122, and perhaps beyond the RAN 110.

The femto-cell controller 122 may be any networking element arranged to carry out the femto-cell controller functions described herein. Thus, the femto-cell controller 122 may include a communication interface, a processor, and data storage containing instructions executable by the processor for carrying out those femto-cell controller functions. The communication interface may include one or more wired and/or wireless interfaces for communicating with at least the VPN-T 120, along with perhaps one or more other entities on the RAN 110, and beyond.

Among other functions, the femto-cell controller 122 communicates via the VPN-T 120 with femto cells such as the femto cell 116. The femto-cell controller 122 may receive requests from various femto cells for configuration data, and those requests may include, among other values, indications of the femto cells' respective locations. The femto-cell controller 122 may also be operable to select various operational parameters for femto cells (e.g. carrier, PN offset, whether to broadcast a pilot signal, contents of any pilot signal to be broadcast, transmission-power level), and to transmit those parameters to femto cells, perhaps along with other configuration data and messaging.

B. Exemplary BSC

Figure 2:
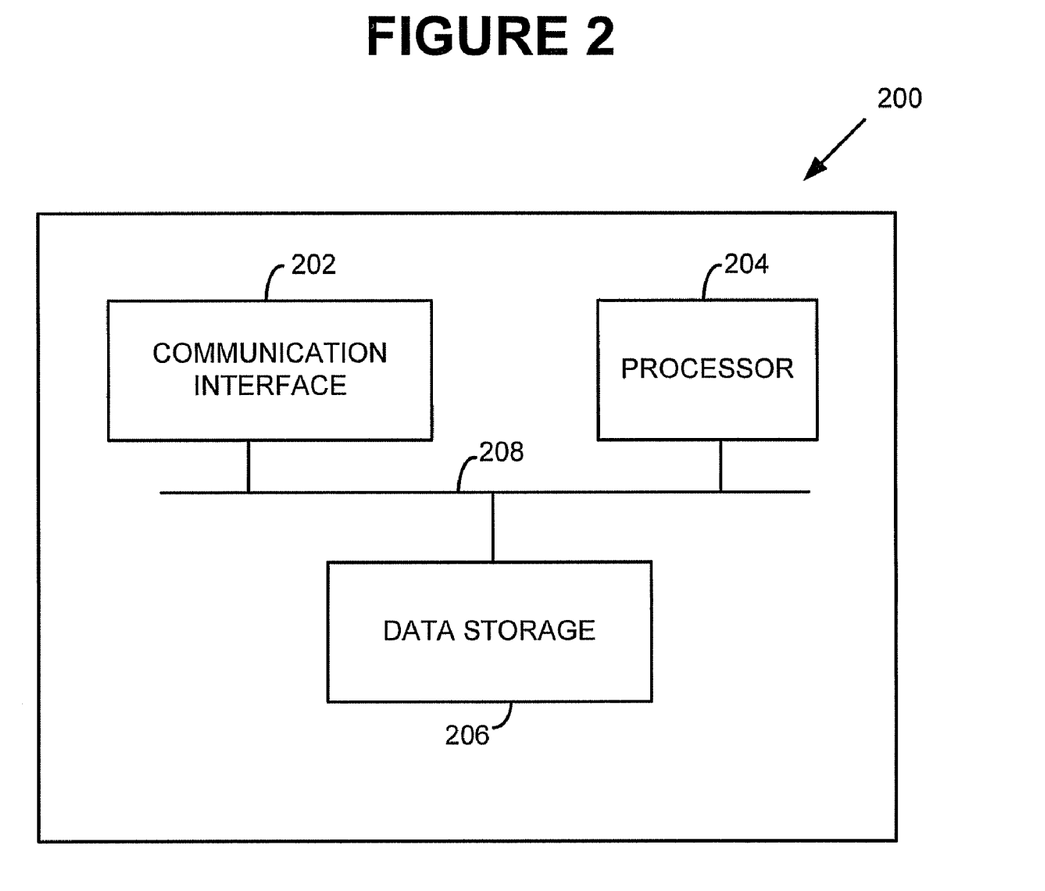
FIG. 2 is a block diagram of a base station controller, in accordance with exemplary embodiments.

FIG. 2 is a block diagram of a BSC (or server, more generally) 200 for use in carrying out an embodiment of the present invention. The BSC 200 may constitute or be integrated in whole or in part with the BSC 106 shown in FIG. 1. As depicted in FIG. 2, the BSC 200 includes a communication interface 202, a processor 204, and data storage 206, all linked together via a system bus, network, or other connection mechanism 208.

The communication interface 202 may include one or more wired and/or wireless interfaces to enable communications between at least the macro BTS 104, MSC 108, and PDSN 112, and other portions of the BSC 200. As examples, the BSC 200 may, via the communication interface 202, receive one or more signals and messages from the mobile station 102, and provide to the mobile station 102 an indication of a modified neighbor list. Of course, the BSC 200 may also communicate with network entities that are not shown in FIG. 1.

The processor 204 may include one or more processors (e.g., one or more general-purpose processors and/or one or more specialized processors). The processor 204 is arranged to carry out functions described herein, and may do so by executing computer-readable program instructions stored in data storage 206 and/or in firmware. In response to executing the program instructions, the processor 204 may interact with the communication interface 202 and/or the connection mechanism 208 to carry out functions described herein.

Data storage 206 may take any of a variety of configurations. For example, data storage 206 may include a computer-readable medium. The computer-readable medium may include volatile and/or non-volatile storage components, such as optical, magnetic, organic, flash, or other memory or disc storage. The computer-readable medium of data storage 206 may be integrated in whole or in part with the processor 204.

Further, data storage 206 may store various types of data. For instance, data storable in data storage 206 may be arranged as program instructions executable by the processor 204. As examples, program instructions executable by the processor 204 may include instructions to: (i) via the communication interface 202, receive a signal indicating that the mobile station 102 detected coverage of the femto cell 116; (ii) in response to receiving the signal, determine whether the mobile station is authorized to be served by the femto cell 116; (iii) in response to receiving the signal, temporarily modify the neighbor list to include the femto cell 116; (iv) modify a handoff process for the mobile station 102 such that the handoff process is biased toward handoff of the mobile station 102 to the femto cell 116; (v) via the communication interface 202, provide to the mobile station 102 an indication of a modified neighbor list, thereby enabling the mobile station 102 to hand off from the macro network to the femto cell 116; (vi) detect that the mobile station 102 completed handoff to the femto cell 116; and (vii) in response to receiving the message indicating that the mobile station completed handoff to the femto cell 116, remove the femto cell 116 from the modified neighbor list. Of course, other examples of program instructions stored in data storage 206 executable by processor 204 are also possible.

As another example, data storage 206 may store reference data. As examples, the reference data may include a neighbor list and profile data. The profile data may indicate various types of information, such as whether the mobile station 102 is authorized to be served by the femto cell 116. Although described as being stored within data storage 206, the profile data may be stored in a remote database that is accessible by the BSC 200 (or the RAN 110, more generally). As an example, the profile data may be stored in a Visitor Location Register (VLR) record corresponding to the mobile station 102, perhaps initially provisioned when a user of the mobile station 102 acquires the femto cell 116 and registers the femto cell 116 with a wireless-service provider.

C. Brief Description of a Handoff Process

Under CDMA, each cell in the RAN 110 typically employs one or more carrier frequencies, and each sector of a given cell is distinguished from adjacent sectors by a PN offset. Further, each sector may concurrently communicate on multiple different channels, distinguished by "Walsh codes." When the mobile station 102 operates in the sector 103B, for instance, communications between the mobile station 102 and the macro BTS 104 of the sector are carried on a given frequency and are encoded by the sector's PN offset and, perhaps, a given Walsh code. Generally, the mobile station 102 receives largely the same signal from each sector in the mobile station's 102 active set (e.g., sectors 103B and 103C) and, on a frame-by-frame basis, may select the best signal to use.

During operation, to facilitate a determination of which sectors should be in the mobile station's 102 active set, macro BTSs such as the macro BTS 104 usually emit a pilot signal on each sector, typically at a power level higher than other downlink signals. The mobile station 102 usually constantly measures the strength of each pilot signal that it receives and notifies the BSC 106, for instance, when the signal strength of a given pilot signal falls above or below designated thresholds. The BSC 106, in turn, provides the mobile station 102 with an updated list of active pilots.

In one exemplary arrangement, the BSC 106 initially transmits to the mobile station 102 (e.g., over a downlink control channel or traffic channel) an HDM that contains parameters such as (i) the PN offsets of the sectors in the mobile station's 102 active set and (ii) the following handoff parameters that relate to pilot-signal strength:

T_ADD: Threshold pilot strength for addition to the active set (e.g., −14 dB)
T_COMP: Difference in signal strength from an active set pilot (e.g., 2 dB)
T_DROP: Threshold pilot strength for removal from the active set (e.g., −16 dB)

T_TDROP: Time for which an active set pilot falls below T_DROP to justify removal from the active set (e.g., 2 seconds)

Additionally, the BSC 106 may initially provide the mobile station 102 with an NLUM, which identifies the neighbor sectors for the mobile station's 102 current active set.

The mobile station 102 may then monitor all of the pilot signals that it receives, and determine if the signal strength of any pilot signal from a sector in the neighbor list (e.g., sector 103D) exceeds T_ADD by T_COMP. If so, the mobile station 102 may add the pilot to its candidate set and send a PSMM to the macro BTS 104, indicating the estimated Ec/Io for the pilot, with the pilot designated by PN offset. Depending on current capacity and other issues, the BSC 106 may then agree to allow the mobile station 102 to hand off to the sector 103D, for instance. Accordingly, the BSC 106 may reserve a channel resource (such as a Walsh code) in the sector 103D and may send to the mobile station 102 an HDM listing the pilot signal from the sector 103D as a new member of the mobile station's 102 active set and directing the mobile station 102 to use the reserved channel resource in the added sector 103D, for example. Further, the BSC 106 may send to the mobile station 102 a new NLUM, designating a new neighbor list corresponding to the mobile station's 102 revised active set.

Upon receipt of the HDM and perhaps NLUM, the mobile station 102 would then add the pilot of the sector 103D to its active set as instructed, and the mobile station 102 would send an HCM to the BSC 106, acknowledging the instruction, and providing a list of the pilots (PN offsets) in its active set, thereby completing the handoff. Of course, other handoff mechanisms could be used instead.

D. Methodologies a. First Embodiment i. Overview

Figure 3:
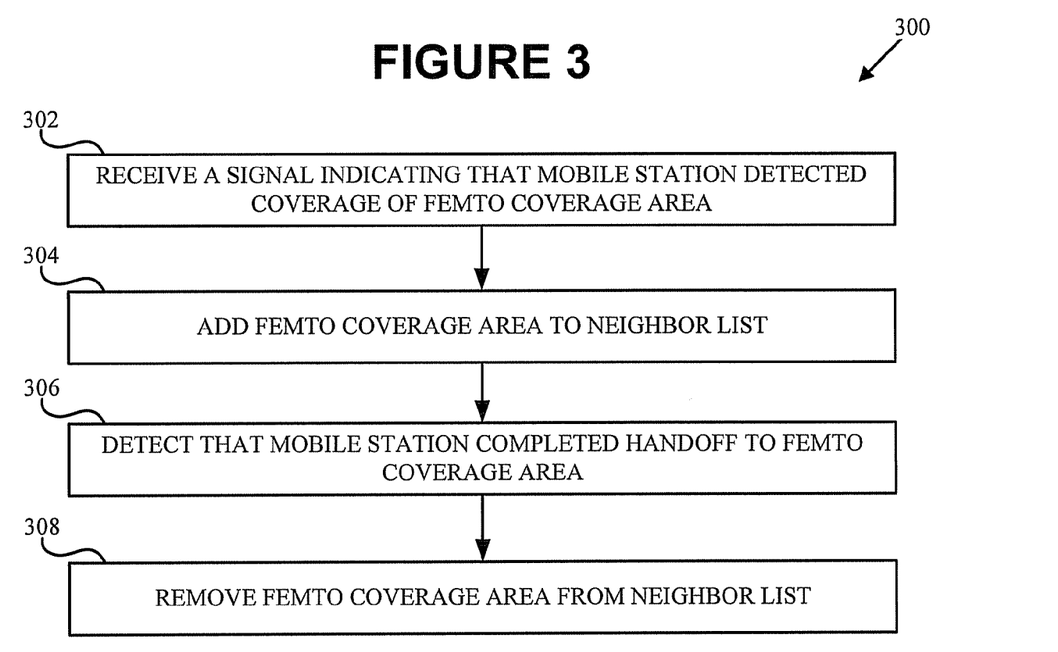
FIG. 3 is a flow chart of a method, in accordance with exemplary embodiments.

FIG. 3 is a flow chart of a method 300 for temporarily modifying a neighbor list to enable the mobile station 102 to hand off from the RAN 110 to the femto cell 116. Two or more of the functions shown in FIG. 3 may occur substantially simultaneously.

In this example, the mobile station 102 is in communication with the macro BTS 104 and is served by the macro sectors 103B and 103C. The BSC 106 maintains in data storage 206 a list of active sectors serving the mobile station 102, the list including sectors 103B and 103C. The BSC 106 also maintains a neighbor list that includes sectors 103A and 103D, but does not initially include the femto cell 116.

In operation, the mobile station 102 receives a pilot signal from the femto cell 116, the signal strength of the pilot signal exceeding a predetermined threshold. The predetermined threshold may, for instance, define a minimum pilot-signal strength that must be exceeded to justify reporting a detected pilot signal to the RAN 110. At block 302, the method includes receiving a signal indicating that the mobile station 102 detected coverage of the femto cell 116. At block 304, the method includes, after receiving the signal, adding the femto cell 116 to the neighbor list, thereby enabling the mobile station to handoff to the femto cell 116. At block 306, the method includes detecting that the mobile station 102 completed handoff to the femto cell 116. And at block 308, the method includes, in response to detecting that the mobile station 102 completed handoff to the femto cell 116, removing the femto cell 116 from the neighbor list.

ii. Method Steps

1. Receive a Signal Indicating that the Mobile Station Detected Coverage of the Femto Cell At block 302, the method includes receiving a signal indicating that the mobile station 102 detected coverage of the femto cell 116. The step of receiving the signal may occur after the mobile station 102 receives a pilot signal from the femto cell 116. The pilot signal may identify the femto cell 116 and define a signal strength that is greater than the above-described predetermined threshold.

The signal may be sent from any of a variety of devices, such as the mobile station 102. Further, the signal may take any of a variety of configurations. For instance, the signal may be a PSMM that that identifies the femto cell 116 and includes an indication of the signal strength of the pilot signal from the femto cell 116. Of course, other examples exist for receiving the signal indicating that the mobile station 102 detected coverage of the femto cell 116.

2. Add the Femto Cell to the Neighbor List

Figure 4:
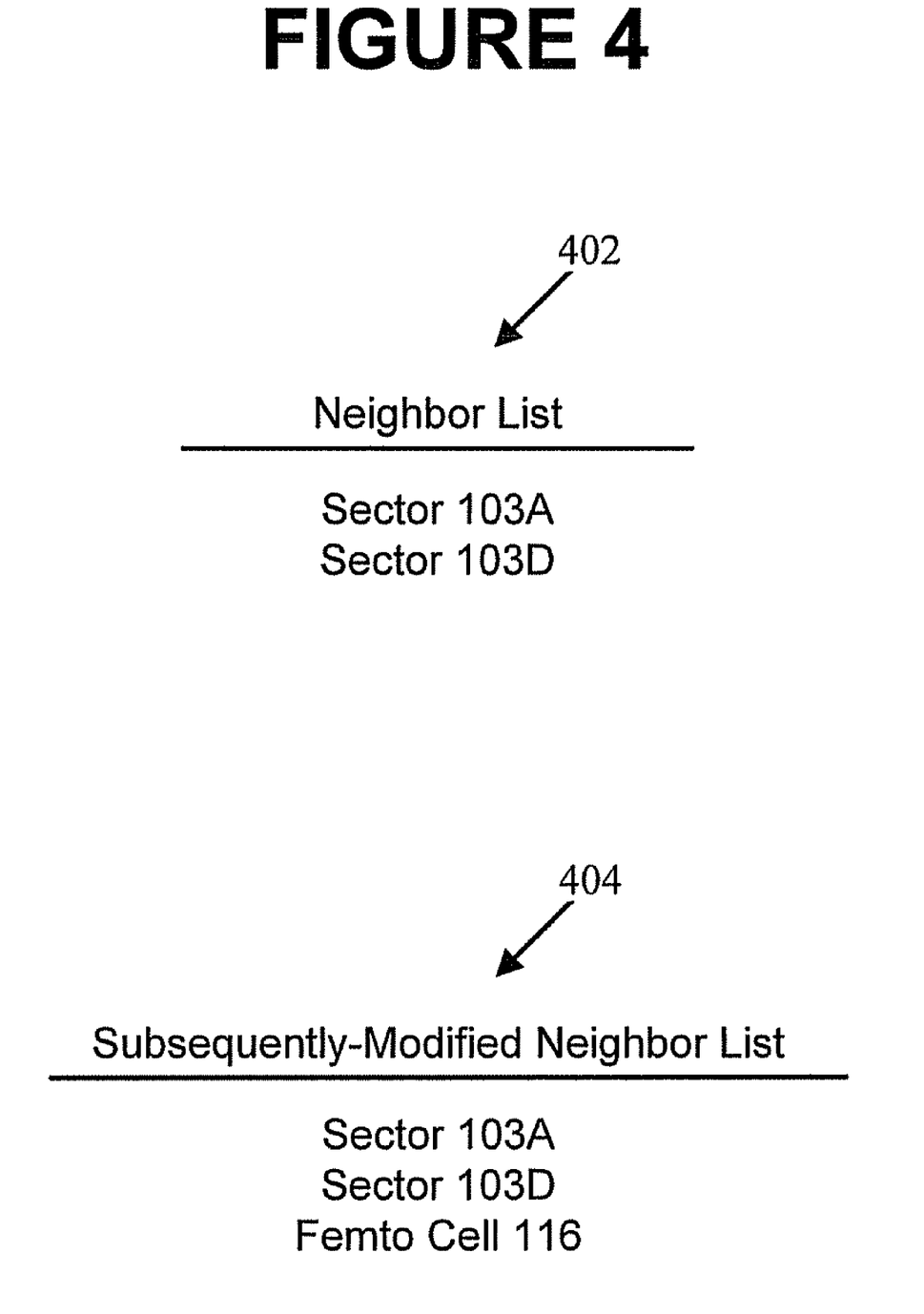
FIG. 4 includes tables that respectively include a neighbor list and a subsequently-modified neighbor list, in accordance with exemplary embodiments.

At block 304, after receiving the signal, the method includes adding the femto cell 116 to the neighbor list. To illustrate, FIG. 4 includes a neighbor list 402 and a subsequently-modified neighbor list 404, according to examples. As shown, the neighbor list 402 includes sectors 103A and 103D. After adding the femto cell 116 to the neighbor list 402, the subsequently-modified neighbor list 404 includes sectors 103A and 103D, along with the femto cell 116. Of course, other examples exist for the neighbor list 402 and the subsequently-modified neighbor list 404.

In one embodiment, the step of adding the femto cell 116 to the neighbor list may occur after determining whether the mobile station 102 is authorized to be served by the femto cell 116. The step of determining whether the mobile station 102 is authorized to be served by the femto cell 116 may be performed in any of a variety of ways, such as by referring to profile data corresponding to the mobile station 102, and determining whether the profile data indicates that the mobile station 102 is authorized to be served by the femto cell 116.

Figure 5:
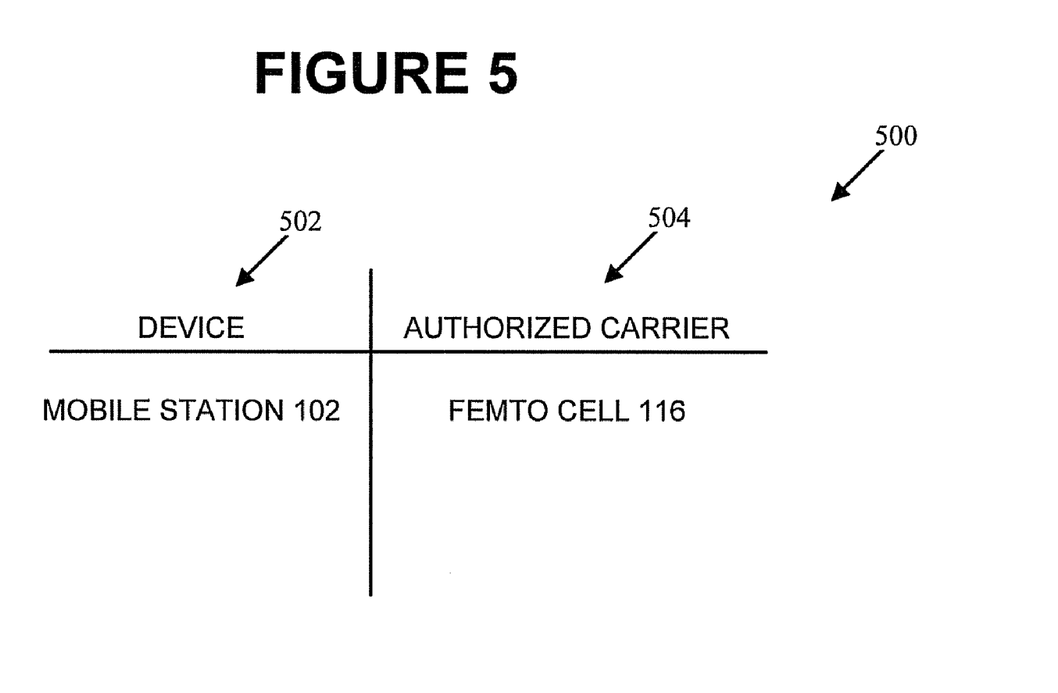
FIG. 5 is a block diagram of a lookup table that includes profile data corresponding to a mobile station, in accordance with exemplary embodiments.

The profile data may be stored within the RAN 110 (or BSC 106, more particularly), or stored remotely from the RAN 110. Further, the profile data may be stored in any of a variety of formats. FIG. 5 is a block diagram of a lookup table 500 that includes profile data corresponding to the mobile station 102, according to an example. As shown, the lookup table 500 includes a column 502 and a column 504. The column 502 may identify the mobile station 102, and the column 404 may indicate whether the mobile station 102 is authorized to be served by the femto cell 116. Of course, other examples exist for the profile data, and for determining whether the mobile station 102 is authorized to be served by the femto cell 116.

If the mobile station 102 is not authorized to be served by the femto cell 116, the BSC 106 may terminate processing, and simply record that the mobile station 102 detected coverage of the femto cell 116. On the other hand, if the mobile station 102 is authorized to be served by the femto cell 116, then the femto cell 116 may be added to the neighbor list, and the BSC 106 may provide to the mobile station 102 an indication of the modified neighbor list. In one example, providing the indication of the modified neighbor list may include sending to the mobile station 102 an NLUM that includes the femto cell 116.

Upon receipt of the indication of the modified neighbor list, the mobile station 102 may then hand off to the femto cell 116 in any of a variety of ways. For example, the mobile station 102 may hand off to the femto cell 116 using a conventional handoff process. To illustrate, the mobile station 102 may determine if the signal strength of the pilot signal from the femto cell 116 exceeds T_ADD by T_COMP. If so, the mobile station 102 may add the pilot signal from the femto cell 116 to the mobile station's 102 candidate set and send a PSMM to the BSC 106, indicating the estimated Ec/Io for the pilot signal from the femto cell 116, with the pilot designated by PN offset.

The BSC 106 may then reserve a channel resource in the sector and may send to the mobile station 102 an HDM listing the pilot signal from the femto cell 116 as a new member of the mobile station's 102 active set and directing the mobile station 102 to use the reserved channel resource in the added femto cell 116. Further, the BSC 106 may send to the mobile station 102 a new NLUM, designating a new neighbor list corresponding to the mobile station's 102 revised active set.

Upon receipt of the HDM and perhaps NLUM, the mobile station 102 would then add the pilot signal from the femto cell 116 to its active set as instructed, and the mobile station 102 would send an HCM to the BSC 106, acknowledging the instruction, and providing a list of the pilots in its active set, thereby completing the handoff.

As another example, the mobile station 102 may handoff to the femto cell 116 using a modified handoff process. As an example, the BSC 106 may modify the handoff process for the mobile station 102 to bias handoff of the mobile station 102 to the femto cell 116. To illustrate, the BSC 106 may store a value indicating a threshold pilot-signal strength that must be exceeded to justify handoff to a given coverage area. As an example, the threshold pilot-signal strength may define a threshold that requires a pilot-signal strength to exceed T_ADD by at least T_COMP. As another example, rather than being a set value, the threshold pilot-signal strength may define a threshold that requires a pilot-signal strength to be a certain amount stronger than the weakest pilot in the active set. Of course, other examples exist for the threshold pilot-signal strength.

Modifying the handoff process for the mobile station 102 may include enabling the mobile station 102 to hand off to the femto cell 116 when the signal strength of the pilot signal from the femto cell 116 is lower than the threshold pilot-signal strength. For example, the signal strength of the pilot signal received from the femto cell 116 may need to exceed T_ADD by only one-half T_COMP, rather than by T_COMP, to justify handoff to the femto cell 116. As another example, the signal strength of the pilot signal from the femto cell 116 may simply be equal to the weakest pilot in the active set to justify handoff to the femto cell 116. Of course, other examples exist for modifying the handoff process for the mobile station 102, and for the mobile station 102 completing handoff to the femto cell 116.

3. Detect that the Mobile Station Completed Handoff to the Femto Cell

At block 306, the method includes detecting that the mobile station 102 completed handoff to the femto cell 116. Detecting that the mobile station 102 completed handoff to the femto cell 116 may be performed in any of a variety of ways, such as by receiving an HCM from the mobile station 102. Of course, other examples exist for detecting that the mobile station 102 completed handoff to the femto cell 116.

4. Remove the Femto Cell from the Neighbor List

At block 308, the method includes, in response to detecting that the mobile station 102 completed handoff to the femto cell 116, removing the femto cell 116 from the neighbor list (or more precisely, the subsequently-modified neighbor list). Removing the femto cell 116 from the neighbor list in such a way may be beneficial for a variety of reasons. For example, removing the femto cell 116 from the neighbor list, after detecting that the mobile station 102 completed handoff to the femto cell 116, may help prevent the neighbor list from becoming saturated by listing too many femto cells.

As another example, removing the femto cell 116 from the neighbor list in such a way may improve overall network efficiency. To illustrate, if the neighbor list continues to list the femto cell 116, another mobile station that is served by the RAN 110 may receive an NLUM that includes the femto cell 116. But if the other mobile station is not authorized to be served by the femto cell 116, then the other mobile station would waste resources and time scanning the femto cell 116 in the normal course of mobile-station operation. Hence, removing the femto cell 116 from the neighbor list, after detecting that the mobile station 102 completed handoff to the femto cell 116, may improve overall network efficiency. Of course, other benefits may result from removing the femto cell 116 from the neighbor list, after detecting that the mobile station 102 completed handoff to the femto cell 116.

b. Second Embodiment i. Overview

Figure 6:
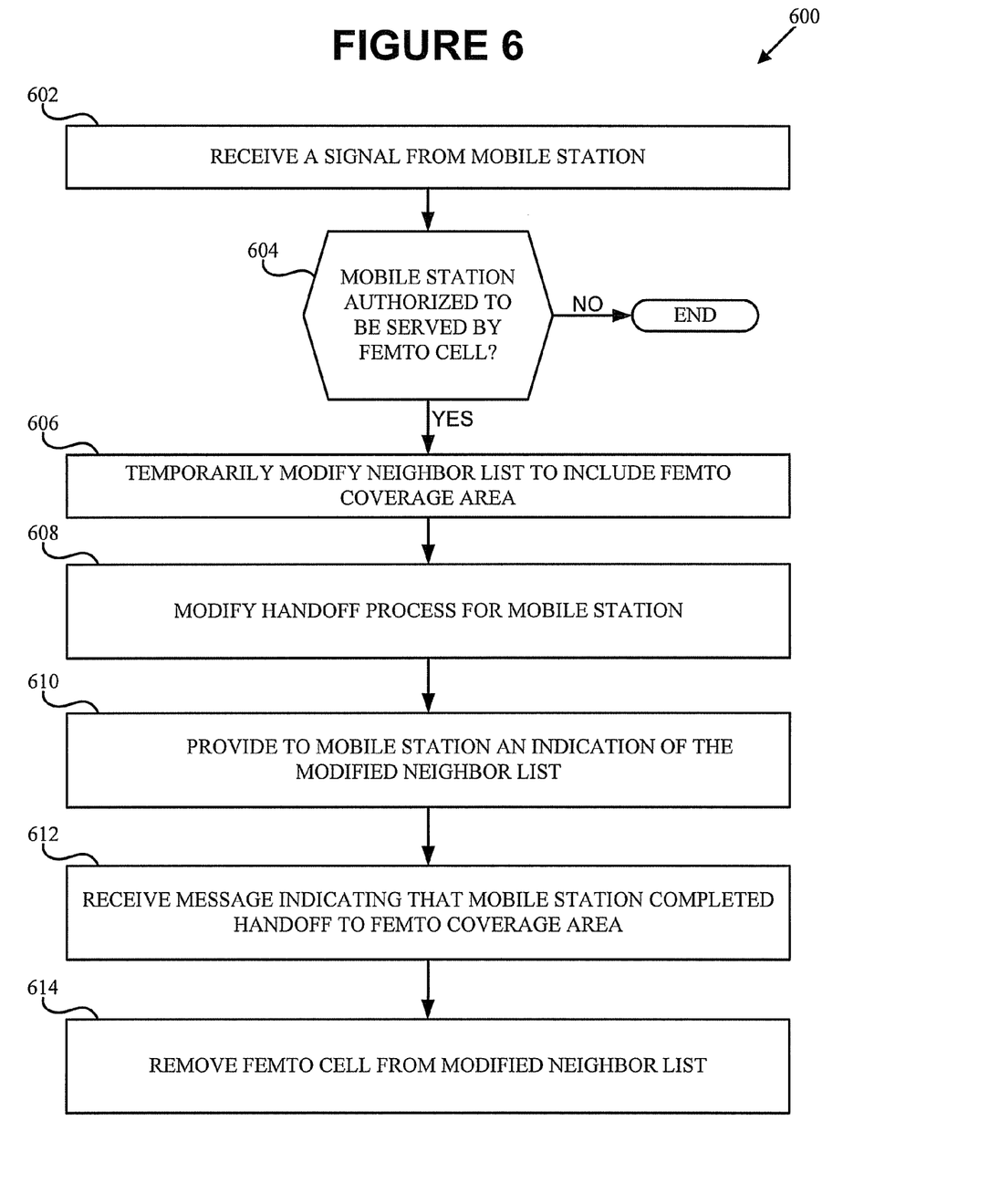
FIG. 6 is a flow chart of a method, in accordance with exemplary embodiments.

FIG. 6 is a flow chart of a method 600 for temporarily modifying a neighbor list to enable the mobile station 102 to hand off from the RAN 110 to the femto cell 116. Two or more of the functions shown in FIG. 6 may occur substantially simultaneously or in a different order than shown. Further, not all of the functions shown in FIG. 6 are required in order to carry out the method 600.

At block 602, the method includes receiving a signal from the mobile station 102, the signal preferably identifying the femto cell 116. At block 604, the method includes, in response to receiving the signal, determining whether the mobile station 102 is authorized to be served by the femto cell 116. At block 606, the method includes, in response to receiving the signal, temporarily modifying the neighbor list to include the femto cell 116. At block 608, the method includes modifying a handoff process for the mobile station 102 such that the handoff process is biased toward handoff of the mobile station 102 to the femto cell 116. At block 610, the method includes providing to the mobile station an indication of the modified neighbor list, thereby enabling the mobile station to hand off from the RAN 110 to the femto cell 116. At block 612, the method includes receiving a message indicating that the mobile station 102 completed handoff to the femto cell 116. And at block 614, the method includes, in response to receiving the message indicating that the mobile station completed handoff to the femto cell 116, removing the femto cell 116 from the modified neighbor list.

ii. Method Steps

1. Receive a Signal from the Mobile Station

At block 602, the method includes receiving a signal from the mobile station 102. The step of receiving the signal may occur after the mobile station 102 receives a pilot signal from the femto cell 116. The pilot signal may identify the femto cell 116 and define a signal strength that is greater than the above-described predetermined threshold.

The signal may take any of a variety of configurations. For instance, the signal may be a PSMM that that identifies the femto cell 116 and includes an indication of the signal strength of the pilot signal from the femto cell 116. Of course, other examples exist for receiving a signal indicating that the mobile station 102 detected coverage of the femto cell 116.

2. Determine whether the Mobile Station is Authorized to be Served by the Femto Cell At block 604, the method includes determining whether the mobile station 102 is authorized to be served by the femto cell 116. The step of determining whether the mobile station 102 is authorized to be served by the femto cell 116 may be substantially similar to the determining step described at block 304.

3. Temporarily Modify the Neighbor List to Include the Femto Cell

At block 606, the method includes, in response to receiving the signal, temporarily modifying the neighbor list to include the femto cell 116. The step of temporarily modifying the neighbor list to include the femto cell 116 may be substantially similar to adding the femto cell 116 to the neighbor list, as described at block 304.

4. Modify the Handoff Process for the Mobile Station

At block 608, the method includes modifying the handoff process for the mobile station 102 such that the handoff process is biased toward handoff of the mobile station 102 to the femto cell 116. The step of modifying the handoff process for the mobile station 102 may be substantially similar to the modifying step as described at block 304.

5. Provide to the Mobile Station an Indication of the Modified Neighbor List

At block 610, the method includes providing to the mobile station 102 an indication of the modified neighbor list. Providing the indication may include sending to the mobile station 102 an NLUM that includes the femto cell 116. Of course, other examples exist for providing to the mobile station 102 an indication of the modified neighbor list. Upon receipt of the indication, the mobile station 102 may then hand off from the RAN 110 to the femto cell 116, using conventional or modified handoff procedures.

6. Receive a Message Indicating that the Mobile Station Completed Handoff to the Femto Cell At block 612, the method includes receiving a message indicating that the mobile station 102 completed handoff to the femto cell 116. As an example, receiving the message indicating that the mobile station 102 completed handoff to the femto cell 116 may include receiving an HCM from the mobile station 102.

7. Removing the Femto Cell from the Neighbor List

At block 614, the method includes, in response to receiving the message indicating that the mobile station 102 completed handoff to the femto cell 116, removing the femto cell 116 from the modified neighbor list. As noted above, removing the femto cell 116 from the neighbor list in such a way may help prevent the neighbor list from becoming saturated by listing too many femto cells, and improve overall network efficiency. Of course, other benefits may result from removing the femto cell 116 from the neighbor list, after detecting that the mobile station 102 completed handoff to the femto cell 116.

E. Conclusion

Exemplary embodiments of the present invention have been described above. Those skilled in the art will understand, however, that changes and modifications may be made to the embodiments described without departing from the true scope and spirit of the present invention, which is defined by the claims.

We claim:

1. In a communications system that includes a mobile station and a macro network, wherein the macro network includes at least one macro coverage area serving the mobile station, and wherein the macro network includes a neighbor list corresponding to the at least one macro coverage area, a method comprising:

receiving, at the macro network, a signal indicating that the mobile station detected coverage of a femto coverage area;

after receiving the signal, adding the femto coverage area to the neighbor list at the macro network, thereby enabling the mobile station to hand off to the femto coverage area;

detecting, at the macro network, that the mobile station completed handoff to the femto coverage area; and in response to detecting that the mobile station completed handoff to the femto coverage area, removing the femto coverage area from the neighbor list at the macro network.

2. In a communications system that includes a mobile station and a macro network, wherein the macro network includes at least one macro coverage area serving the mobile station, and wherein the macro network includes a neighbor list corresponding to the at least one macro coverage area, a method for temporarily modifying the neighbor list to enable the mobile station to hand off from the macro network to a femto coverage area, the method comprising:

receiving, at the macro network, a signal from the mobile station, wherein the signal identifies the femto coverage area, and wherein the femto coverage area is initially not included in the neighbor list;

in response to receiving the signal, temporarily modifying the neighbor list at the macro network to include the femto coverage area;

providing from the macro network to the mobile station an indication of the modified neighbor list, thereby enabling the mobile station to hand off from the macro network to the femto coverage area;

receiving, at the macro network, a message indicating that the mobile station completed handoff to the femto coverage area; and in response to receiving the message indicating that the mobile station completed handoff to the femto coverage area, removing the femto coverage area from the modified neighbor list at the macro network.

3. The method of claim 2, wherein the step of receiving the signal from the mobile station occurs after the mobile station receives a pilot signal from the femto coverage area, the pilot signal identifying the femto coverage area and defining a pilot-signal strength that is above a predetermined threshold.

4. The method of claim 3, wherein the signal from the mobile station is a Pilot Strength Measurement Message (PSMM) that identifies the femto coverage area and includes an indication of the pilot-signal strength.

5. The method of claim 2, further comprising, in response to receiving the signal, determining whether the mobile station is authorized to be served by the femto coverage area.

6. The method of claim 5, wherein determining whether the mobile station is authorized to be served by the femto coverage area comprises:

referring to profile data corresponding to the mobile station; and determining whether the profile data indicates that the mobile station is authorized to be served by the femto coverage area.

7. The method of claim 6, wherein the macro network includes the profile data.

8. The method of claim 2, wherein providing to the mobile station an indication of the modified neighbor list comprises sending to the mobile station a Neighbor List Update Message (NLUM) that includes the femto coverage area.

9. The method of claim 2, wherein receiving the message indicating that the mobile station completed handoff to the femto coverage area comprises receiving a Handoff Completion Message (HCM) from the mobile station.

10. The method of claim 2, further comprising modifying a handoff process for the mobile station such that the handoff process is biased toward handoff of the mobile station to the femto coverage area.

11. The method of claim 10, wherein the macro network stores a value indicating a threshold pilot-signal strength that must be exceeded to justify handoff to a given coverage area, and wherein modifying the handoff process for the mobile station comprises enabling the mobile station to handoff to the femto coverage area when a pilot-signal strength from the femto coverage area is lower than the threshold pilot-signal strength.

12. The method of claim 2, wherein the macro network is a radio access network.

13. The method of claim 2, wherein the femto coverage area includes a plurality of femto coverage areas.

14. A system for temporarily modifying a macro-network neighbor list to enable a mobile station to hand off from a macro network to a femto coverage area, wherein the macro network includes at least one macro coverage area serving the mobile station, and wherein the macro-network neighbor list corresponds to the least one macro coverage area, the system comprising, at the macro network:
 a communication interface;
 a processor; and
 data storage containing (i) the macro-network neighbor list and (ii) instructions executable by the processor to:
  (a) via the communication interface, receive a signal from the mobile station, wherein the signal identifies the femto coverage area, and wherein the femto coverage area is initially not included in the macro-network neighbor list;
  (b) in response to receiving the signal, temporarily modify the macro-network neighbor list to include the femto coverage area;
  (c) via the communication interface, provide to the mobile station an indication of the modified macro-network neighbor list, thereby enabling the mobile station to hand off from the macro network to the femto coverage area;
  (d) via the communication interface, receive a message indicating that the mobile station completed handoff to the femto coverage area; and
  (e) in response to receiving the message indicating that the mobile station completed handoff to the femto coverage area, remove the femto coverage area from the modified macro-network neighbor list.

15. The system of claim 14, wherein the step of receiving the signal from the mobile station occurs after the mobile station receives a pilot signal from the femto coverage area, the pilot signal identifying the femto coverage area and defining a pilot-signal strength that is above a predetermined threshold.

16. The system of claim 14, further comprising instructions to, in response to receiving the signal, determine whether the mobile station is authorized to be served by the femto coverage area.

17. The system of claim 14, wherein the instructions to provide to the mobile station the indication of the modified macro-network neighbor list comprise instructions to send to the mobile station a Neighbor List Update Message (NLUM) that includes the femto coverage area.

18. The system of claim 14, wherein the message is a Handoff Completion Message (HCM).

19. The system of claim 14, further comprising instructions to modify a handoff process for the mobile station such that the handoff process is biased toward handoff of the mobile station to the femto coverage area.

20. The system of claim 19, wherein the femto coverage area includes a plurality of femto coverage areas.

\* \* \* \* \*